United States Patent
Geiter et al.

(10) Patent No.: US 6,632,897 B1
(45) Date of Patent: Oct. 14, 2003

(54) USE OF NANO-SCALED METAL OXIDE PARTICLES AS POLYMERIZATION CATALYSTS

(75) Inventors: Elisabeth Geiter, Konz (DE); Helmut Schmidt, Saarbruecken-Guedingen (DE)

(73) Assignee: Institut Für Neue Materialien gemeinnützige, Saarbrücken (DE)

( * ) Notice: Subject to any disclaimer, the term of this patent is extended or adjusted under 35 U.S.C. 154(b) by 0 days.

(21) Appl. No.: 09/446,439

(22) PCT Filed: Jun. 23, 1998

(86) PCT No.: PCT/EP98/03846

§ 371 (c)(1), (2), (4) Date: Dec. 20, 1999

(87) PCT Pub. No.: WO98/58969

PCT Pub. Date: Dec. 30, 1998

(30) Foreign Application Priority Data

Jun. 24, 1997 (DE) .......... 197 26 829

(51) Int. Cl.[7] .......... C08F 4/18; C08G 61/12
(52) U.S. Cl. .......... 526/107; 526/95; 526/102; 526/104; 526/106; 526/226; 526/240; 526/241; 526/279; 526/908; 525/326.5; 525/372; 525/373; 522/66; 528/14; 528/16; 528/17; 528/18; 528/19; 528/323; 528/326; 528/409; 528/411; 528/414; 528/416; 528/417; 528/423

(58) Field of Search .......... 526/95, 104, 106, 526/279, 908, 102, 107, 194, 309, 226, 240, 241; 522/66; 525/373, 326.5, 372; 528/14, 16, 17, 18, 19, 323, 326, 409, 410, 411, 414, 416, 417, 423

(56) References Cited

U.S. PATENT DOCUMENTS 5,716,679 A * 2/1998 Krug et al. .......... 427/515

FOREIGN PATENT DOCUMENTS

| GB | 879892 | * 10/1961 | .......... 526/107 |
| GB | 1046618 | * 10/1966 | .......... 526/908 X |

* cited by examiner

Primary Examiner—Fred Teskin
(74) Attorney, Agent, or Firm—Heller Ehrman; White & McAuliffe LLP

(57) ABSTRACT

Described is the use of nanoscale metal oxide particles as catalysts for the thermal and/or photochemical polymerization of species having at least one polymerizable carbon-carbon multiple bond and/or at least one carbon containing ring capable of undergoing a ring opening polymerization.

42 Claims, No Drawings

USE OF NANO-SCALED METAL OXIDE PARTICLES AS POLYMERIZATION CATALYSTS

The present invention relates to the use of nanoscale metal oxide particles as polymerization catalysts. Particularly, the present invention relates to the use of nanoscale metal oxide particles as catalysts which can replace the conventional catalysts for the thermal and photochemical polymerization of (e.g. radically) polymerizable species such as, e.g., peroxides, azo compounds and the conventional UV polymerization initiators. This allows the manufacture of inorganic-organic composite materials containing or consisting of an inorganic network which does not contain any residues derived from said conventional polymerization initiators.

It is already known to crosslink silicon containing polycondensates or heteropoly-condensates wherein, for example, an epoxy group or a methacrylic group is covalently bonded to a silicon atom in the presence of thermally or photochemically active catalysts by means of said functional organic groups. Moreover, it is known that by using nanoscale fillers which are homogeneously dispersed in an inorganic-organic matrix transparent molded articles and coatings may be produced.

According to the present invention it has surprisingly been found that it is possible to effect a polymerization or crosslinking by means of certain polymerizable groupings even without the above-mentioned conventional catalysts if nanoscale particles (in the following sometimes referred to as nanoparticles) of certain substances are mixed with (e.g. dispersed in) said species which are to be polymerized or crosslinked, respectively and which show said polymerizable groupings, and the resulting mixture is treated thermally and/or irradiated (with UV light). This makes it possible, for example, to thermally and/or photochemically effect the polymerization of species (monomers, oligomers and polymers including polycondensates) having (meth)acrylate groups, as well as the polyaddition of species having an epoxide ring in the sole presence of said nanoparticles as catalysts. It is believed that the catalytic action of said nanoparticles is primarily due to the presence of (numerous) Lewis acid or Lewis base centers, respectively, on the surface thereof.

Although it is known that, e.g., aluminum alkyls catalyze polymerization reactions of double bonds according to the Ziegler-Natta process, similar catalytic effects of particles have not as yet been known.

Accordingly the present invention provides a process for the thermal and/or photochemical polymerization or crosslinking of species (monomers, oligomers and polymers including polycondensates) having at least one polymerizable carbon-carbon multiple bond and/or at least one carbon containing ring capable of undergoing a ring opening polymerization, said ring preferably containing at least one heteroatom selected from the group consisting of oxygen, nitrogen and sulfur as ring atom, wherein said process is characterized in that as (preferably sole) thermal and/or photochemical polymerization catalyst nanoscale particles of at least one metal oxide (including mixed oxides of metals) is used.

Said process makes it possible to produce, e.g., (highly transparent) molded articles and coatings, particularly for optical purposes, said molded articles and coatings being also an object of the present invention.

Among the advantages of the present invention is the fact that the conventional polymerization and polyaddition catalysts may be dispensed with and as a result thereof no corresponding decomposition products are present in the final polymer (e.g. molded article or coating) and that the polymerization catalysts employed according to the present invention are not subject to inhibition by oxygen, which constitutes a problem with many of the conventionally used (particularly UV) initiators.

In the following the process according to the present invention will be explained in more detail.

The species to be polymerized or crosslinked may be both purely organic species and mixed inorganic-organic species.

In the present description and the appended claims the term "organic species" is meant to denote species which in addition to carbon and hydrogen as mandatory components may optionally contain only elements selected from the group consisting of oxygen, nitrogen, sulfur and halogen (i.e., fluorine, chlorine, bromine and iodine). On the other hand, "inorganic-organic species" is to denote those species which in addition to the just mentioned elements may optionally contain further elements, particularly and preferably silicon, but also other elements such as, e.g., metals like aluminum, titanium and zirconium (preferably in addition to silicon).

According to the present invention preferred inorganic-organic species are (monomeric) hydrolyzable silicon compounds which in addition to one or more hydrolyzable groups (e.g. alkoxy groups) contain at least one non-hydrolyzable radical having a polymerizable carbon-carbon multiple bond (preferably a double bond) or a carbon containing ring capable of undergoing a ring opening polymerization (polyaddition) (preferably an epoxide ring) as well as precondensates (oligomers) and polycondensates derived from said monomeric silanes. Said precondensates or polycondensates, respectively, may in turn be those which are derived from one or more of the just described hydrolyzable silanes having a polymerizable carbon-carbon double bond or a ring capable of undergoing a ring opening polymerization as well as optionally, in addition thereto, from one or more other hydrolyzable silanes (without the just mentioned groups) and one or more hydrolyzable compounds of other elements cocondensable with said hydrolyzable silanes, for example those of aluminum, titanium and zirconium. It is, however, preferred that such precondensates and polycondensates are derived exclusively from hydrolyzable silanes.

The hydrolyzable silanes having a polymerizable group (in the following the term "polymerizable group" is meant to comprise not only polymerizable carbon-carbon multiple bonds but also carbon containing rings capable of undergoing a ring opening polymerization) are preferably compounds having 2 or 3, preferably 3, hydrolyzable radicals and 1 or 2, preferably 1, non-hydrolyzable radicals featuring a polymerizable group (preferably (meth)acrylate group or epoxide ring). Examples of hydrolyzable radicals are halogen (F, Cl, Br and 1, particularly Cl and Br), alkoxy (particularly $C_{1-4}$ alkoxy such as, e.g., methoxy, ethoxy, n-propoxy, i-propoxy and butoxy), aryloxy (particularly $C_{6-10}$ aryloxy such as phenoxy), acyloxy (particularly $C_{1-4}$ acyloxy such as acetoxy and propionyloxy) and alkylcarbonyl (e.g. acetyl). Particularly preferred hydrolyzable radicals are alkoxy groups, especially methoxy and ethoxy.

Said polymerizable groups are bonded to the silicon atom preferably in the form of a group R—O—$(CH_2)_n$—Si, wherein R represents the group comprising the polymerizable entity and n has a value of from 1 to 10, preferably from 2 to 6. A particularly preferred linking group between R and Si is the oxypropyl group.

Hydrolyzable silicon compounds featuring a polymerizable group which are particularly preferred according to the present invention are those of the general formula

wherein the groups X, the same or different from each other (preferably the same), represent a hydrolyzable group (preferably $C_{1-4}$ alkoxy and particularly methoxy and ethoxy) and R' represents a glycidyloxy $C_{1-6}$ alkylene or methacryloxy $C_{1-6}$ alkylene radical.

It also is possible that in the above formula one or two radicals X, preferably one radical X, is replaced by a non-hydrolyzable radical without polymerizable group such as, e.g., an alkyl or aryl group, for example methyl, ethyl and phenyl.

Additional examples of hydrolyzable silanes having a polymerizable group are, e.g., those having a vinyl or allyl group directly bonded to the silicon.

Specific examples of hydrolyzable silanes to be employed as species to be polymerized or crosslinked, respectively (or as starting materials therefor) according to the present invention (optionally in the form of precondensates or polycondensates, respectively) are 3-glycidyloxypropyltrimethoxy silane, 3-glycidyloxypropyltriethoxy silane, 3-glycidyloxypropylmethyldimethoxy silane, 3-glycidyloxypropylmethyldiethoxy silane, 3-glycidyloxypropylethoxydimethoxy silane, 3-methacryloxypropyltrimethoxy silane, 3-methacryloxypropyltriethoxy silane, 3-methacryloxypropylmethyidichloro silane, 3-methacryloxypropylmethyldiethoxy silane and 3-methacryloxypropylmethyl-dimethoxy silane.

Among the purely organic species which can be polymerized according to the process of the present invention, preferred are those having at least one polymerizable carbon-carbon double bond (preferably activated by at least one electron-withdrawing group contained therein) and/or at least one carbon containing ring capable of undergoing a ring opening polymerization and featuring at least one heteroatom selected from the group consisting of O, S and N, and having 3 or 4 ring members (particularly oxirane, aziridine and oxetane ring). Specific examples of corresponding compounds are compounds derived from acrylic acid and methacrylic acid such as, e.g., the acids themselves, (meth)acrylonitrile, esters (preferably $C_{1-4}$ alkyl esters), amides and anhydrides of said acids, maleic acid, maleic anhydride, fumaric acid, vinylacetate, vinylchloride, crotonic acid and derivatives thereof (e.g. esters and amides), styrene and derivatives thereof (particularly those having electron-withdrawing groups on the aromatic ring such as chlorostyrene), ethylene oxide, propylene oxide, butylene oxide, cyclopentene oxide, cyclohexene oxide, aziridine and oxetane and compounds containing groups corresponding to said ring compounds.

According to the present invention it is, of course, also possible to subject to polymerization or polyaddition, respectively other ring compounds, e.g., lactams like e-captolactam, such as lactams having 5 to 7 ring members.

The catalysts employed according to the present invention are metal oxides, preferably (mixed) oxides (including hydrated forms thereof) of metals from the main groups IIIa and IVa as well as the subgroups Ib, IIb, IVb, Vb and VIb of the Periodic Table of Elements.

Preferred according to the present invention are metal oxides of aluminum, tin, copper, silver, zinc, titanium, zirconium, vanadium, niobium, chromium, molybdenum and tungsten, the oxides of aluminum (particularly, boehmit), tin, titanium and zirconium being particularly preferred.

As already mentioned above said metal oxide particles are nanoscale particles. In the present description and the appended claims the term "nanoscale particles" is meant to denote particles having an average particle size of not more than 200 nm, preferably not more than 100 nm, the particularly preferred particle size ranging from 2 to 50 nm. It is of course possible to also employ particles having a size of 1 nm and less, although said particles are less preferred due to their poorer availability.

Said nanoscale particles may be employed either as such (e.g. in powder form) or in the form of a (preferably aqueous and/or alcoholic) suspension, or may as well be prepared in situ.

The nanoscale metal oxide particles may be both amorphous and crystalline and may furthermore have optionally been subjected to a surface modification, for example by reacting a part of the OH groups present on the surfaces thereof with (preferably purely organic) compounds having, in addition to a group reactive with said OH groups (e.g. a carboxyl group), a polymerizable group identical with the polymerizable group of the species to be polymerized or crosslinked, respectively so that the catalyst particles are not only trapped in the resulting network but are even bonded thereto through covalent bonds. The surface modification of said nanoscale particles may, for example, be effected in a manner already described in detail in the prior art for the case of silica and alumina particles.

The preparation of the nanoscale particles may, for example, be carried out by hydrolyzing (preferably at room temperature) one (or more) hydrolyzable metal compound (s) such as a salt, a complex or an alkoxide (particularly $C_{1-6}$ alkoxide, e.g., with methoxy, ethoxy, n-propoxy, i-propoxy, n-butoxy and butoxyethoxy as alkoxy group) in alcoholiclaqueous solutions. Said alcoholic/aqueous solutions preferably contain $C_{1-6}$ alcohols (e.g. methanol, ethanol, n-propanol, i-propanol, n-butanol and/or butoxyethanol) and diluted inorganic acids (e.g. HCl solutions). The ratio by weight of hydrolyzable metal compound and alcohol preferably ranges from 0.1 to 0.25. The water content in the reaction mixture depends on the number of hydrolyzable groups in the metal compound and preferably is from 0.5 to 5, particularly from 1 to 3 moles of water per mole of hydrolyzable group.

The nanoscale metal oxide particles which are employed as catalysts according to the present invention are usually employed in an amount of 0.5 to 50% by wt., preferably 1 to 40% by wt. and particularly preferred 2 to 35% by wt., based on the total weight of the nanoscale particles and the species to be polymerized or crosslinked, respectively.

The manufacture of coatings according to the process of the present invention may, for example, be carried out by adding the nanoscale metal oxide, e.g., as such or in the form of a suspension prepared as described above, to the species to be polymerized or crosslinked, respectively. In order to adjust the rheological properties a solvent may be added to the resulting composition or solvent already present therein may be removed therefrom, respectively. Particularly in the case of the above described inorganic-organic species as species to be polymerized or crosslinked, respectively, alcohols which are liquid at room temperature and which may optionally contain ether groups (e.g. methanol, ethanol, propanols, butanols and butoxyethanol) are preferably used as the solvents to be added.

The resulting coating composition may then be applied by standard coating methods such as, e.g., dip coating, bar coating, brush coating, doctor blade coating, roll coating, spray coating and spin coating onto a suitable substrate which may have been subjected to a usual pretreatment in order to improve the adhesion. Preferably the substrate is a transparent substrate such as glass or a transparent plastic (such as polymethylmethacrylate).

The curing (organic polymerization or polyaddition, respectively and optionally, in addition thereto, a further condensation of precondensates derived from hydrolyzable silicone compounds) is carried out after an optional predrying operation at room temperature (in order to partially remove the solvent).

In the case of compositions for the manufacture of molded articles the volatile components (e.g. alcohols derived from hydrolysis, solvents for predispersing the particulate materials) are at least partially removed from the mixture (e.g. by distillation). Subsequently the concentrated mixture may, for example, be poured or injected, respectively into molds.

The organic polymerization or polyaddition, respectively of the polymerizable groups (e.g. methacrylate groups or epoxy groups) may take place thermally (preferably at temperatures ranging from 70 to 200° C., particularly from 90 to 130° C.) and/or be initiated by irradiation (preferably by means of UV light) in the presence of the nanoscale metal oxide particles employed according to the present invention. In the case of the photochemical polymerization it is particularly preferred, especially with inorganic-organic species as species to be polymerized or crosslinked, respectively, to carry out a thermal post-treatment at, for example, 90 to 130° C. after the photochemical polymerization (i.e., a thermal post-condensation of condensable groups still present in said inorganic-organic species).

As already mentioned above the process according to the present invention is particularly suited for the manufacture of transparent molded articles and coatings for optical purposes but is not limited to said application. Furthermore it may be pointed out that the catalysts according to the present invention may, of course, serve a dual function (especially when used in the upper range of the quantitative ranges indicated), i.e., they may function not only as catalysts but also as (optionally reinforcing) filler for the polymerized matrix of organic or inorganic-organic species.

The nanoscale metal oxide particles employed in accordance with the present invention (particularly, those of $SnO_2$, $ZrO_2$, $TiO_2$ and $Al_2O_3$) are also suitable for deblocking of blocked isocyanate functions. One may make use of this fact, for instance, in the preparation of polyurethanes and polyureas from blocked polyisocyanates and polyalcohols or polyamines.

The following examples serve to further illustrate the present invention.

EXAMPLE 1

A. Preparation of Amorphous $TiO_2$

To a mixture of 76.018 g of 2-propanol, 4.965 g of fuming HCl solution (37%) and 1.038 g of bidistilled water there are slowly added dropwise 10.525 g of titanium tetraisopropanolate (0.037 moles). The resulting clear reaction mixture is stirred at room temperature for 24 hours. Thereafter the mixture is concentrated to half of its volume by distillation (water bath temperature: 40° C., pressure: 150 to 50 mbar).

B. Use of the Amorphous $TiO_2$ for the Polymerization of GPTS Precondensates

To 23.63 g of glycidyloxypropyltrimethoxy silane (GPTS, 0.1 mole) there are added 2.70 g of 0.1 N HCl and stirred at room temperature for 2 hours. Thereafter the $TiO_2$ suspension prepared as described above under section A is added dropwise to said reaction mixture. The resulting clear, slightly yellow reaction mixture is stirred for an additional 2 hours at room temperature.

Subsequently the resulting composite material is applied onto microscopic glass slides and cured thermally at 90 to 130° C., resulting in the formation of transparent coatings.

In order to examine the epoxide crosslinking solid-$^{13}$C-NMR studies were conducted on the thermally cured material. The signals typical for glycidyl groups (the epoxy ring) at 44.5 and 51.6 ppm could not be detected anymore in said examination.

EXAMPLE 2

A. Preparation of Amorphous $ZrO_2$

Zirconium tetra-n-propanolate (14.35 g; 0.037 moles) is slowly added dropwise to a mixture of 76.022 g of 2-propanol, 4.965 g of fuming HCl (37%) and 1.038 g of bidistilled water. Initially the reaction mixture is strongly opaque but becomes clear, with a strong generation of heat, after 5 minutes of stirring at room temperature.

B. Use of the Amorphous $ZrO_2$ for the Polymerization of GPTS Precondensates 0.1N HCl solution (2.70 g) is added to 23.63 g of GPTS (0.1 mole) and stirred at room temperature for 2 hours. Subsequently the $ZrO_2$ suspension prepared as described above under section A is added dropwise to said reaction mixture. The resulting slightly translucent, slightly yellow reaction mixture is stirred for a further 2 hours at room temperature.

Thereafter the resulting composite material is applied to microscopic glass slides and cured thermally at 90 to 130° C., resulting in the formation of transparent coatings.

Like in the case of Example 1, signals at 44.5 and 51.6 ppm could no longer be detected by solid-$^{13}$C-NMR examination on the thermally cured material.

EXAMPLE 3

A. Dispersion of Crystalline $TiO_2$

Crystalline anatas (4 g, 0.05 moles) is slowly added to 40 g of 0.1 N HCl solution.

The mixture is stirred at room temperature for about 10 minutes. Thereby a slightly translucent, slightly yellow suspension is formed.

B. Use of Crystalline $TiO_2$ for the Polymerization of GPTS Precondensates 0.1N HCl solution (2.70 g) is added to 23.63 g of GPTS (0.1 moles) and stirred at room temperature for 2 hours. Thereafter the anatas suspension prepared as described above under section A is added dropwise to said reaction mixture. Initially a clear reaction mixture is formed which becomes opaque after 10 minutes. By adding 1.5 g of fuming HCl the reaction mixture becomes clear under vigorous generation of heat.

Subsequently the resulting composite material is applied onto microscopic glass slides and is cured thermally at 90 to 130° C., thereby forming transparent coatings wherein signals at 44.5 and 51.6 ppm can no longer be detected in solid-$^{13}$C-NMR measurements.

EXAMPLE 4

A. Preparation of amorphous $TiO_2$

The procedure described in Example 1, section A, was followed with the exception of omitting the concentration of the mixture by distillation.

B. Use of the Amorphous $TiO_2$ for the Polymerization of MPTS Precondensates 0.1N HCl solution (2.70 g) is added to 24.83 g of methacryloxypropyltrimethoxy silane (MPTS, 0.1 moles) and stirred at room temperature for 2 hours. Thereafter the $TiO_2$ suspension from section A is added dropwise to said reaction mixture. The resulting clear, slightly yellow reaction mixture is stirred for a further 2 hours at room temperature.

Subsequently the coating material is applied onto microscopic glass slides and is passed four times, each time at a belt speed of 2 m/min and at 50% lamp output, through a belt irradiation device manufactured by the company Beltron, and irradiated thereby. In the course of said treatment the liquid films are cured to form transparent coatings.

In order to examine the organic polymerization at the methacrylate group lR measurements on coated silicon wafers were carried out after the photochemical curing described above.

The signal area for the C=C bond (using the invariable signal area of the C=O bond as reference) decreased from 11.66 scale parts prior to the irradiation to 4.2 scale parts after the irradiation.

EXAMPLE 5

The procedure of Example 4 is repeated with the exception that in place of the photochemical polymerization the coating material applied onto the microscopic slides is treated thermally at 100° C. for 2 hours. In the course of said treatment the liquid composite material cures into transparent coatings.

In the IR examination described in Example 4 the signal area for the C=C bond decreased from 11.66 scale parts prior to the thermal curing to 7.9 scale parts after the thermal curing.

EXAMPLE 6

A. Preparation of Amorphous $ZrO_2$

Zirconium tetraisopropanolate (20.0 g, 0.026 moles) is slowly added dropwise to a mixture of 150.0 g of 2-propanol and 4.965 g of fuming HCl (37%). The resulting clear reaction mixture is stirred at room temperature for about 15 to 20 minutes.

B. Use of the Amorphous $ZrO_2$ for the Polymerization of MPTS Precondensates MPTS (11.03 g, 0.022 moles) is added to the mixture described under A, whereafter the reaction solution is stirred at room temperature for 10 minutes. Then a water/isopropanol mixture (2.25 g of bidistilled water and 20 g of isopropanol) is added to the mixture. The resulting clear reaction mixture is heated with stirring at 100° C. for 1 hour. Thereafter the reaction mixture is concentrated to about 1/6 of its volume by distillation, resulting in a slightly translucent, yellowish sol.

Subsequently the coating material is applied onto microscopic glass slides and passed twice, each time at a belt speed of 2 m/min and at 50% lamp output, through a irradiation device (manufactured by the company Beltron). In the course of said treatment the liquid films cure into transparent coatings.

In order to examine the organic polymerization the IR measurement described above in Example 4 was carried out. It was found that the signal area for the C=C bond decreased from 15.67 scale parts prior to the irradiation to 6.5 scale parts after the irradiation.

EXAMPLE 7

The procedure of Example 6 was repeated but a thermal polymerization at 100° C. (2 hours) was carried out in place of a photochemial polymerization. In the course of said treatment the liquid composite material cured into transparent coatings. In the IR examination the signal area for the C=C bond decreased from 15.67 scale parts to 12.5 scale parts after the thermal treatment.

PREPARATION EXAMPLE 1

Dispersion of Nanoscale Metal Oxide Powders in Different Media (a) 20.473 g of ethanol in a Schott flask are acidified by adding concentrated acetic acid at pH=2.8. Thereafter 0.519 g of γ-AlO(OH) (Disperal® Special, Condea) are added slowly under vigorous stirring to the liquid phase. During the addition of the powder, the pH is continuously monitored using a pH electrode for non-aqueous solvents, and optionally re-adjusted to 2.8 by adding dropwise concentrated acetic acid. The suspension is then ultrasonicated at room temperature for approx. 20 minutes.

(b) 6.95 g of bidistilled $H_2O$, 20.15 g of 0.1N aqueous HCl solution and 1.18 g of butoxyethanol are mixed. To the mixture obtained are slowly added 0.721 g of γ-AlO(OH)$_{AcOH}$ (Disperal® Sol P3, Condea) under vigorous stirring. The suspension is then ultrasonicated at room temperature for approx. 20 minutes.

(c) To 16.01 9 of 0.1N aqueous HCl solution are slowly added under vigorous stirring 1.59 g of γ-AlO(OH)$_{AcOH}$ (Disperal® Sol P3, Condea). The suspension is then ultrasonicated at room temperature for approx. 20 minutes.

(d) 4.77 g of 0.1N aqueous HCl solution and 1.05 g of acetylacetone are mixed. To the mixture obtained are slowly added 0.721 g of γ-AlO(OH)$_{AcOH}$ (Disperal® Sol P3, Condea) under vigorous stirring. The suspension is then ultrasonicated at room temperature for approx. 20 minutes.

(e) 19.98 g of bidistilled water are provided. The pH of the aqueous phase is adjusted to 3.5 by adding concentrated nitric acid. Under vigorous stirring 2.15 g of γ-$Al_2O_3$ (Degussa) are slowly added. During the addition of the powder, the pH is continuously controlled using a pH electrode and is re-adjusted at 3.5 by adding dropwise concentrated nitric acid. The suspension is then ultrasonicated at room temperature for approx. 20 minutes.

(f) 0.21 g of γ$Al_2O_3$ (Alumina C, Degussa) or γAlO(OH) (Disperal® Special, Condea) or γ-AlO(OH)$_{AcOH}$ (Disperal® Sol P3, Condea) are added in small portions under vigorous stirring to 11.82 g of GPTS. The suspension is then ultrasonicated at room temperature for approx. 20 minutes.

(g) 0.19 g of γ$Al_2O_3$ (Alumina C, Degussa) or 0.18 g of γAlO(OH) (Disperal® Special, Condea) or 0.24 g of γ-AlO(OH)$_{AcOH}$ (Disperal® Sol P3, Condea) are added in small portions under vigorous stirring to 10.42 g of tetraethoxy silane (TEOS). The suspension is then ultrasonicated at room temperature for approx. 20 minutes.

(h) 0.19 g of γAl$_2$O$_3$ (Alumina C, Degussa) or 0.22 g of γAlO(OH) (Disperal® Special, Condea) or γAlO(OH)$_{AcOH}$ (Disperal® Sol P3, Condea) are added in small portions under vigorous stirring to 11.23 g of γaminopropyltriethoxy silane (AMEO). The suspension is then ultrasonicated at room temperature for approx. 20 minutes.

(i) 0.17g of γAl$_2$O$_3$ (Alumina C, Degussa) or 0.18 g of γAlO(OH) (Disperal® Special, Condea) or 0.24 g of γ-AlO(OH)$_{AcOH}$ (Disperal® Sol P3, Condea) are added in small portions under vigorous stirring to 10.05 g of N-(2-aminoethyl)-3-aminopropyltrimethoxy silane (DIAMO). The suspension is then ultra-sonicated at room temperature for approx. 20 minutes.

(j) 0.39 g of γAl$_2$O$_3$ (Alumina C, Degussa) or γAlO(OH) (Disperal® Special, Condea) or γ-AlO(OH)$_{AcOH}$ (Disperal® Sol P3, Condea) are added in small portions under vigorous stirring to 17.43 g of GPTS. The suspension is then ultrasonicated at room temperature for approx. 20 minutes.

(k) 0.30 g of γAl$_2$O$_3$ (Alumina C, Degussa) or γAlO(OH) (Disperal® Special, Condea) or γ-AlO(OH)$_{AcOH}$ (Disperal® Sol P3, Condea) are added in small portions under vigorous stirring to 12.67 g of TEOS. Thereafter 2.19 g of 0.1 N HCl solution are added with stirring to this mixture.

(l) 0.44 g of γAl$_2$O$_3$ (Alumina C, Degussa) or γAlO(OH) (Disperal® Special, Condea) or γ-AlO(OH)$_{AcOH}$ (Disperal® Sol P3, Condea) are added in small portions under vigorous stirring to 19.23 g of AMEO. Thereafter 2.85 g of 0.1 N HCl solution are added with stirring to this mixture.

PREPARATION EXAMPLES 2 to 15

Preparation of Coating Sols

GPTS and TEOS or phenyltrimethoxy silane (PTMS) are mixed in a 500 ml round flask and then an amount of AlO(OH) suspension (cf. Preparation Example 1 (c)) is added which (calculated as water) is required for a semi-stochiometric hydrolysis of the alkoxy silanes. The mixture is stirred at room temperature for about 2 hours and then the rest of the boehmit suspension is added whereafter stirring is continued for another 2 hours. Thereafter a solvent and a rheological additive are added to the mixture. The reaction mixture is then stirred at room temperature for at least 3 hours. The weighed amounts of the educts employed are compiled in Table 1.

TABLE 1

Composition of the coating sols

| Preparation Example | 2 | 3 | 4 | 5 | 6 |
|---|---|---|---|---|---|
| GPTS | 118.17 g (0.5 mol) | 118.17 g (0.5 mol) | 118.17 g (0.5 mol) | 118.17 g (0.5 mol) | 118.17 g (0.5 mol) |
| TEOS | 104.15 g (0.5 mol) | 83.33 g (0.4 mol) | 62.50 g (0.3 mol) | 41.67 g (0.2 mol) | 20.83 g (0.1 mol) |
| [1)]Boehmit suspension total | 70.51 g (=0.1 mol AlO(OH)) | 70.51 g (=0.1 mol AlO(OH)) | 70.51 g (=0.1 mol AlO(OH)) | 70.51 g (=0.1 mol AlO(OH)) | 70.51 g (=0.1 mol AlO(OH)) |
| [2)]Boehmit suspension | 31.50 g | 27.90 g | 24.30 g | 20.70 g | 17.10 g |

TABLE 1-continued

Composition of the coating sols

| | | | | | |
|---|---|---|---|---|---|
| Solvent | 58.57 g 1-BuOH or BuOEtOH | 54.40 g 1-BuOH | 50.23 g 1-BuOH | 46.07 g 1-BuOH | 41.90 g 1-BuOH |
| Rheological additive | 0.702 g BYK 301 | 0.653 g BYK 301 | 0.603 g BYK 301 | 0.553 g BYK 301 | 0.503 g BYK 301 |

| Preparation Example | 7 | 8 | 9 | 10 | 11 |
|---|---|---|---|---|---|
| GPTS | 118.17 g (0.5 mol) | 141.80 g (0.6 mol) | 118.17 g (0.5 mol) | 118.17 g (0.5 mol) | 118.17 g (0.5 mol) |
| TEOS | — | — | 104.15 g (0.5 mol) | 83.33 g (0.4 mol) | 62.50 g (0.3 mol) |
| PTMS | — | 32.85 g (0.2 mol) | — | — | — |
| [1)]Boehmit suspension (total) | 70.51 g (=0.1 mol AlO(OH)) | 70.51 g (=0.1 mol AlO(OH)) | 141.02 g (=0.2 mol AlO(OH)) | 141.02 g (=0.2 mol AlO(OH)) | 141.02 g (=0.2 mol AlO(OH)) |
| [2)]Boehmit suspension | 13.50 g | 21.60 g | 31.50 g | 27.90 g | 24.30 g |
| Solvent | 37.74 g 1-BuOH | 49.03 g 1-BuOH or BuOEtOH | 72.67 g 1-BuOH or BuOEtOH | 68.50 g 1-BuOH | 64.34 g 1-BuOH |
| Rheological additive | 0.453 g BYK 301 | 0.588 g BYK 301 or 306 | 0.872 g BYK 301 | 0.822 g BYK 301 | 0.772 g BYK 301 |

| Preparation Example | 12 | 13 | 14 | 15 |
|---|---|---|---|---|
| GPTS | 118.17 g (0.5 mol) | 118.17 g (0.4 mol) | 94.53 g (0.4 mol) | 94.53 g (0.4 mol) |
| TEOS | 41.67 g (0.2 mol) | 20.83 g (0.1 mol) | 62.50 g (0.3 mol) | 41.67 g (0.2 mol) |
| [1)]Boehmit suspension (total) | 141.02 g (=0.2 mol AlO(OH)) | 141.02 g (=0.2 mol AlO(OH)) | 141.02 g (=0.2 mol AlO(OH)) | 141.02 g (=0.2 mol AlO(OH)) |
| [2)]Boehmit suspension | 20.70 g | 17.10 g | 21.60 g | 18.00 g |
| Solvent | 60.17 g 1-BuOH | 56.00 g 1-BuOH | 59.61 g 1-BuOH or BuOEtOH | 55.44 g 1-BuOH |
| Rheological additive | 0.722 g BYK 301 or 306 | 0.672 g BYK 301 | 0.715 g BYK 301 | 0.665 g BYK 301 |

[1)]total amount of 8.5 wt. % boehmit suspension (cf. Preparation Example 1 (c))
[2)]amount of 8.5 wt. % boehmit suspension (calculated as water) for semi-stochiometric hydrolysis of the silane components.

PREPARATION EXAMPLES 16 to 35

Preparation of Coating Sols

GPTS and TEOS (or PTMS) are mixed in a 500 ml round flask and then an amount of AlO(OH) suspension (cf. Preparation Example 1 (c)) is added which (calculated as water) is required for a semi-stochiometric hydrolysis of the alkoxy silanes. The mixture is stirred at room temperature for about 2 hours and then cooled in an ice bath to about 0° C. Aluminum tributoxyethanolate is added dropwise with cooling. The mixture is then stirred at room temperature for approx. 2 hours. The rest of the boehmit suspension is then added dropwise with cooling to the reaction mixture. After stirring at room temperature for another 2 hours, a solvent and a rheological additive are added to the mixture. The weighed amounts of the educts employed are compiled in Table 2.

TABLE 2

Composition of the coating sols

| Preparation Example | 16 | 17 | 18 | 19 | 20 |
|---|---|---|---|---|---|
| GPTS | 118.17 g (0.5 mol) | 118.17 g (0.5 mol) | 118.17 g (0.5 mol) | 118.17 g (0.5 mol) | 94.53 g (0.4 mol) |
| TEOS | — | 62.50 g (0.3 mol) | 41.67 g (0.2 mol) | 20.83 g (0.1 mol) | 83.33 g (0.4 mol) |
| 1)Boehmit suspension total) | 141.02 g (=0.2 mol AlO(OH)) | 70.51 g (=0.1 mol AlO(OH)) | 141.02 g (=0.2 mol AlO(OH)) | 141.02 g (=0.2 mol AlO(OH)) | 70.51 g (=0.1 mol AlO(OH)) |
| 2)Boehmit suspension | 13.50 g | 24.30 g | 20.70 g | 17.10 g | 25.2 g |
| Al (OEtOBu)$_3$ | — | 37.85 g (0.1 mol) | 37.85 g (0.1 mol) | 37.85 g (0.1 mol) | 37.85 g (0.1 mol) |
| Other additives | 3.66 g diethyl-amine | — | — | — | — |
| Solvent | 54.53 g EtOH denat. | 57.81 g 1-BuOH or BuOEtOH | 67.85 g 1-BuOH | 63.57 g 1-BuOH or BuOEtOH | 57.24 g 1-BuOH |
| Rheological additive | 0.654 g BYK 301 | 0.694 g BYK 301 | 0.814 g BYK 301 | 0.763 g BYK 301 or 306 | 0.687 g BYK 301 |

| Preparation Example | 21 | 22 | 23 | 24 | 25 |
|---|---|---|---|---|---|
| GPTS | 141.80 g (0.6 mol) | 189.06 g (0.8 mol) | 118.17 g (0.5 mol) | 118.17 g (0.5 mol) | 118.17 g (0.5 mol) |
| TEOS | 41.67 g (0.2 mol) | — | 104.16 g (0.5 mol) | 62.50 g (0.3 mol) | 41.67 g (0.2 mol) |
| 1)Boehmit suspension total) | 70.51 g (=0.1 mol AlO(OH)) | 70.51 g (=0.1 mol AlO(OH)) | 141.02 g (=0.2 mol AlO(OH)) | 141.02 g (=0.2 mol AlO(OH)) | 141.02 g (=0.2 mol AlO(OH)) |
| 2)Boehmit suspension | 33.40 g | 21.60 g | 31.50 g | 24.30 g | 25.20 g |
| Al (OEtOBu)$_3$ | 37.85 g (0.1 mol) | 37.85 g (0.1 mol) | 37.85 g (0.1 mol) | 37.85 g (0.1 mol) | 75.71 g (0.2 mol) |
| Other additives | — | — | — | — | — |
| Solvent | 58.37 g 1-BuOH | 59.48 g 1-BuOH | 80.24 g 1-BuOH | 71.91 g 1-BuOH or BuOEtOH | 75.31 g 1-BuOH |
| Rheological additive | 0.700 g BYK 306 | 0.714 g BYK 306 | 0.963 g BYK 301 | 0.863 g BYK 301 or 306 | 0.904 g BYK 301 |

| Preparation Example | 26 | 27 | 28 | 29 | 30 |
|---|---|---|---|---|---|
| GPTS | 118.17 g (0.5 mol) | 118.17 g (0.5 mol) | 118.17 g (0.5 mol) | 165.43 g (0.7 mol) | 141.80 g (0.6 mol) |
| TEOS | 20.83 g (0.1 mol) | — | 60.50 g (0.3 mol) | 20.83 g (0.1 mol) | 41.67 g (0.2 mol) |
| 1)Boehmit suspension total) | 141.02 g (=0.2 mol AlO(OH)) | 141.02 g (=0.2 mol AlO(OH)) | 141.02 g (=0.2 mol AlO(OH)) | 70.51 g (=0.1 mol AlO(OH)) | 70.51 g (=0.1 mol AlO(OH)) |
| 2)Boehmit suspension | 17.10 g | 13.50 g | 24.30 g | 22.50 g | 23.40 g |
| Al (OEtOBu)$_3$ | 75.71 g (0.2 mol) | 75.71 g (0.2 mol) | 75.71 g (0.2 mol) | 37.85 g (0.1 mol) | 37.85 g (0.1 mol) |
| Other Additives | — | — | — | — | — |
| Solvent | — | — | 79.48 g 1-BuOH or BuOEtOH | 58.92 g 1-BuOH or BuOEtOH | 58.37 g 1-BuOH |
| Rheological additive | — | — | 0.954 g BYK 301 | 0.707 g BYK 301 or 306 | 0.700 g BYK 301 |

| Preparation Example | 31 | 32 | 33 | 34 | 35 |
|---|---|---|---|---|---|
| GPTS | 94.53 g | 70.90 g | 118.17 g | 118.17 g | 141.80 g |
| | (0.4 mol) | (0.3 mol) | (0.5 mol) | (0.5 mol) | (0.6 mol) |
| TEOS | 104.16 g (0.5 mol) | 104.16 g (0.5 mol) | 62.50 g (0.3 mol) | — | — |
| 1)Boehmit suspension (total) | 70.51 g (=0.1 mol AlO(OH)) | 70.51 g (=0.1 mol AlO(OH)) | 70.51 g (=0.1 mol AlO(OH)) | 141.02 g (=0.2 mol AlO(OH)) | 70.51 g (=0.1 mol AlO(OH)) |
| 2)Boehmit suspension | 28.80 g | 26.10 g | 24.30 g | 22.50 g | 16.20 g |
| Al (OEtOBu)$_3$ | 37.85 g (0.1 mol) | 37.85 g (0.1 mol) | 37.85 g (0.1 mol) | 37.85 g (0.1 mol) | 37.85 g (0.1 mol) |
| Other additives | — | — | — | — | — |
| Solvent | 61.41 g 1-BuOH | 56.68 g 1-BuOH | 57.81 g 1-BuOH or BuOEtOH | 59.41 g 1-BuOH | 50.03 g 1-BuOH or BuOEtOH |
| Rheological additive | 0.737 g BYK 301 | 0.680 g BYK 301 | 0.694 g BYK 301 or 306 | 0.713 g BYK 301 | 0.600 g BYK 301 |

1)total amount of 8.5 wt. % boehmit suspension (cf. Preparation Example 1 (c))
2)amount of 8.5 wt. % boehmit suspension (calculated as water) for semi-stochiometric hydrolysis of the silane components

PREPARATION EXAMPLE 36

118.17 g of GPTS and 62.50 g of TEOS are mixed in a 500 ml round flask. For semi-stochiometric hydrolysis of the alkoxy silanes, 24.30 g of AlO(OH) suspension (cf. Preparation Example 1 (c)), calculated as water, are added to the mixture. The reaction mixture is stirred at room temperature for about 2 hours whereafter 45.66 g of bisphenol A are added. The mixture is stirred at room temperature until bisphenol A is completely dissolved. Then 37.85 g of aluminum tributoxyethanolate are added dropwise with cooling in an ice bath. Thereafter the mixture is stirred at room temperature for about 2 hours. 46.21 g of boehmit suspension are then added dropwise with ice cooling to the mixture. After 2 hours of stirring at room temperature a solvent and a rheological additive are added to the mixture.

PREPARATION EXAMPLE 37

118.17 g of GPTS and 62.50 g of TEOS are mixed in a 500 ml round flask. For semi-stochiometric hydrolysis of the alkoxy silanes, 24.30 g of AlO(OH) suspension (cf. Preparation Example 1 (c)), calculated as water, are added to the mixture. The reaction mixture is stirred at room temperature for about 2 hours whereafter 4.10 g of 1-methylimidazole are added. The reaction solution is stirred at room temperature for another 2 hours and then 116.72 g of boehmit suspension are added. After 2 hours of stirring at room temperature a solvent and a rheological additive are added to the mixture.

PREPARATION EXAMPLE 38

165.43 g of GPTS and 20.83 g of TEOS are mixed in a 500 ml round flask. For semi-stochiometric hydrolysis of the alkoxy silanes 17.10 g of AlO(OH) suspension (cf. Preparation Example 1 (c)), calculated as water, are added to the mixture. The reaction mixture is stirred at room temperature for about 2 hours whereafter 63.92 g of bisphenol A are added. The mixture is stirred at room temperature until bisphenol A is completely dissolved. Then 2.87 g of 1-methylimidazole are added to the reaction mixture. The mixture is stirred at room temperature for about 2 hours and then 53.41 g of boehmit suspension are added. After 2 hours of stirring at room temperature a solvent and a rheological additive are added to the mixture.

PREPARATION EXAMPLE 39

118.17 g of GPTS and 62.50 g of TEOS are mixed in a 500 ml round flask. For semi-stochiometric hydrolysis of the alkoxy silanes 24.30 g of AlO(OH) suspension (cf. Preparation Example 1 (c)), calculated as water, are added to the mixture. The reaction mixture is stirred at room temperature for about 2 hours whereafter 50.56 g of 1,4-butanediol diglycidylether are added. Then 37.85 g of aluminum tributoxy-ethanolate are added dropwise to the mixture with cooling in an ice bath. Thereafter the mixture is stirred at room temperature for about 2 hours and 46.21 g of boehmit suspension are then added dropwise with ice cooling. After 2 hours of stirring at room temperature a solvent and a rheological additive are added to the mixture.

What is claimed is:

1. A process for the thermal and/or photochemical polymerization or crosslinking of at least one compound containing at least one polymerizable carbon-carbon multiple bond, comprising polymerizing or crosslinking the at least one compound in the presence of a catalyst consisting of nanoscale particles of at least one metal oxide or mixed metal oxide of metals selected from the group consisting of metals of main groups IIIa and IVa and subgroup Ib of the Periodic Table of Elements and Zr.

2. A process according to claim 1, where at least one compound to be polymerized or crosslinked is a monomer, oligomer, or polymer, containing only carbon, hydrogen, and optionally one or more elements selected from oxygen, nitrogen, sulfur, and halogen.

3. A process according to claim 1, where the at least one compound to be polymerized or crosslinked is a monomer, oligomer, or polymer, containing carbon, hydrogen, optionally one or more elements selected from oxygen, nitrogen, sulfur, and halogen, and additionally the element silicon and optionally one or more elements selected from the group consisting of aluminum, titanium, and zirconium.

4. A process according to claim 3, where the at least one compound to be polymerized or crosslinked contains at least one silicon atom to which a polymerizable carbon-carbon multiple bond is linked via a Si—C bond.

5. A process according to claim 1, where the polymerizable carbon-carbon multiple bond is a carbon-carbon double bond.

6. A process according to claim 5, where the carbon-carbon double bond is a double bond of an acrylic or methacrylic group.

7. A process according to claim 1, where the nanoscale particles are added to the at least one compound to be polymerized or crosslinked.

8. A process according to claim 1, where the nanoscale particles are generated in situ.

9. A process according to claim 8, where the nanoscale particles are generated by hydrolysis and condensation of corresponding starting compounds.

10. A process according to claim 1, where the nanoscale particles have an average particle size of from 1 to 100 nm.

11. A process according to claim 10, where the nanoscale particles have an average particle size of from 2 to 50 nm.

12. A process according to claim 1, where the nanoscale particles are used in an amount of 0.5 to 50 wt. % based on the total weight of the nanoscale particles and the at least one compound to be polymerized or crosslinked.

13. A process according to claim 12, where the nanoscale particles are used in an amount of 2 to 35 wt. % based on the total weight of the nanoscale particles and the at least one compound to be polymerized or crosslinked.

14. A process according to claim 1 for the production of a molded article or coating.

15. A process according to claim 14 for the production of a transparent molded article or coating.

16. A process for the thermal and/or photochemical polymerization or crosslinking of at least one compound having at least one carbon-containing ring capable of undergoing a ring-opening polymerization, comprising polymerizing or crosslinking the at least one compound in the presence of a catalyst comprising nanoscale particles of at least one metal oxide or mixed metal oxide.

17. A process according to claim 16 where the at least one compound contains at least one heteroatom selected from the group consisting of oxygen, nitrogen and sulfur as a ring atom.

18. A process according to claim 16, where the at least one compound to be polymerized or crosslinked is a monomer, oligomer or polymer, containing only carbon, hydrogen, and optionally one or more of oxygen, nitrogen, sulfur, and halogen.

19. A process according to claim 16, where the at least one compound to be polymerized or crosslinked is a monomer, oligomer or polymer, containing carbon, hydrogen, optionally one or more of oxygen, nitrogen, sulfur and halogen, and additionally the element silicon and optionally one or more elements selected from the group consisting of aluminum, titanium, and zirconium.

20. A process according to claim 19, where the at least one compound to be polymerized or crosslinked has at least one silicon atom to which a carbon-containing ring capable of undergoing a ring-opening polymerization is linked via a Si—C bond.

21. A process according to claim 16, where the ring capable of undergoing a ring-opening polymerization is a ring having 3 or 4 ring members.

22. A process according to claim 21 where the ring capable of undergoing a ring-opening polymerization is an oxirane, oxetane or aziridine ring.

23. A process according to claim 16, where the ring capable of undergoing a ring-opening polymerization is a lactam ring.

24. A process according to claim 23, where the ring capable of undergoing a ring-opening polymerization is a lactam ring having 5 to 7 ring members.

25. A process according to claim 16, where the metal oxide is derived from at least one metal selected from the main groups IIIa and IVa and the subgroups Ib, IIb, IVb, Vb, and VIb.

26. A process according to claim 25, where the metal is selected from at least one of Al, Sn, Cu, Ag, Zn, Ti, Zr, V, Nb, Cr, Mo and W.

27. A process according to claim 26, where the metal is selected from Sn, Ti and Zr.

28. A process according to claim 16, where the nanoscale particles are added to the at least one compound to be polymerized or crosslinked.

29. A process according to claim 16, where the nanoscale particles are generated in situ.

30. A process according to claim 29, where the nanoscale particles are generated by hydrolysis and condensation of corresponding starting compounds.

31. A process according to claim 16, where the nanoscale particles have an average particle size of from 1 to 100 nm.

32. A process according to claim 31, where the nanoscale particles have an average particle size of from 2 to 50 nm.

33. A process according to claim 16, Al where the nanoscale particles are used in an amount of 0.5 to 50 wt. % based on the total weight of the nanoscale particles and the species to be polymerized or crosslinked.

34. A process according to claim 33, where the nanoscale particles are used in an amount of 2 to 35 wt. % based on the total weight of the nanoscale particles and the species to be polymerized or crosslinked.

35. A process according to claim 16, where the nanoscale particles are used as the sole catalyst.

36. A process according to claim 16, for the production of a molded article or coating.

37. A process according to claim 36 for the production of a transparent molded article or coating.

38. A molded article or coating prepared by the process of claim 16.

39. An optical molded article or coating prepared according to the process of claim 16.

40. A process according to claim 1, where the metal is selected from at least one of Al, Sn, Cu, Ag, and Zr.

41. A process according to claim 40, where the metal is Al.

42. A process according to claim 1, where the nanoscale particles have been surface modified.

* * * * *